(12) United States Patent
Noda

(10) Patent No.: US 9,835,833 B2
(45) Date of Patent: Dec. 5, 2017

(54) WIDE ANGLE LENS AND IMAGING APPARATUS

(71) Applicant: FUJIFILM Corporation, Tokyo (JP)

(72) Inventor: Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 14/848,945

(22) Filed: Sep. 9, 2015

(65) Prior Publication Data
US 2015/0378136 A1 Dec. 31, 2015

Related U.S. Application Data

(63) Continuation of application No. PCT/JP2013/007647, filed on Dec. 26, 2013.

(30) Foreign Application Priority Data

Mar. 15, 2013 (JP) ................. 2013-052925

(51) Int. Cl.
*G02B 13/02* (2006.01)
*G02B 13/18* (2006.01)
*G02B 13/04* (2006.01)

(52) U.S. Cl.
CPC ............. *G02B 13/18* (2013.01); *G02B 13/04* (2013.01)

(58) Field of Classification Search
CPC ...... G02B 9/04; G02B 15/161; G02B 15/177; G02B 13/24
(Continued)

(56) References Cited

U.S. PATENT DOCUMENTS 5,946,144 A * 8/1999 Yamamoto ............. G02B 13/06
359/663
2009/0244720 A1* 10/2009 Yamaguchi ............ G02B 15/14
359/690
(Continued)

FOREIGN PATENT DOCUMENTS

JP 2010-176098 8/2010
JP 2011-102871 5/2011
(Continued)

OTHER PUBLICATIONS

M.G. Dreyfus et. al. "Aplanatic Cemented Doublet Design", Journal of the Optical Society of America, vol. 50, No. 4, 375-378.*
(Continued)

*Primary Examiner* — Ricky Mack
*Assistant Examiner* — Robert E Tallman
(74) *Attorney, Agent, or Firm* — Young & Thompson

(57) ABSTRACT

A wide angle lens is constituted by, in order from the object side to the image side: a front group having a negative refractive power; an aperture stop; and a rear group having a positive refractive power. The front group includes, in order from the object side to the image side, a first meniscus lens having a negative refractive power, and a second meniscus lens having a negative refractive power. The rear group includes a first cemented lens formed by cementing a negative lens and a positive lens, provided in this order from the object side, together, most toward the image side, and a lens having at least one aspherical surface and a negative refractive power provided adjacent to the first cemented lens at the object side thereof.

9 Claims, 4 Drawing Sheets

(58) Field of Classification Search
USPC .............. 359/676, 680–682, 691, 743, 793
See application file for complete search history.

(56) References Cited

U.S. PATENT DOCUMENTS

| | | |
|---|---|---|
| 2010/0195216 A1 | 8/2010 | Miyazaki et al. |
| 2011/0109974 A1 | 5/2011 | Sato |
| 2011/0235191 A1 | 9/2011 | Kawamura et al. |
| 2012/0218646 A1 | 8/2012 | Kimura |

FOREIGN PATENT DOCUMENTS

| | | |
|---|---|---|
| JP | 2011-209377 | 10/2011 |
| JP | 2012-173730 | 9/2012 |

OTHER PUBLICATIONS

International Search Report, PCT/JP2013/007647, dated Apr. 1, 2014.
International Search Opinion, PCT/JP2013/007647, dated Apr. 1, 2014.
Chinese Office Action dated Dec. 29, 2016; Application No. 2013800744759.

* cited by examiner

EXAMPLE 1

EXAMPLE 2

FIG.3 EXAMPLE 3
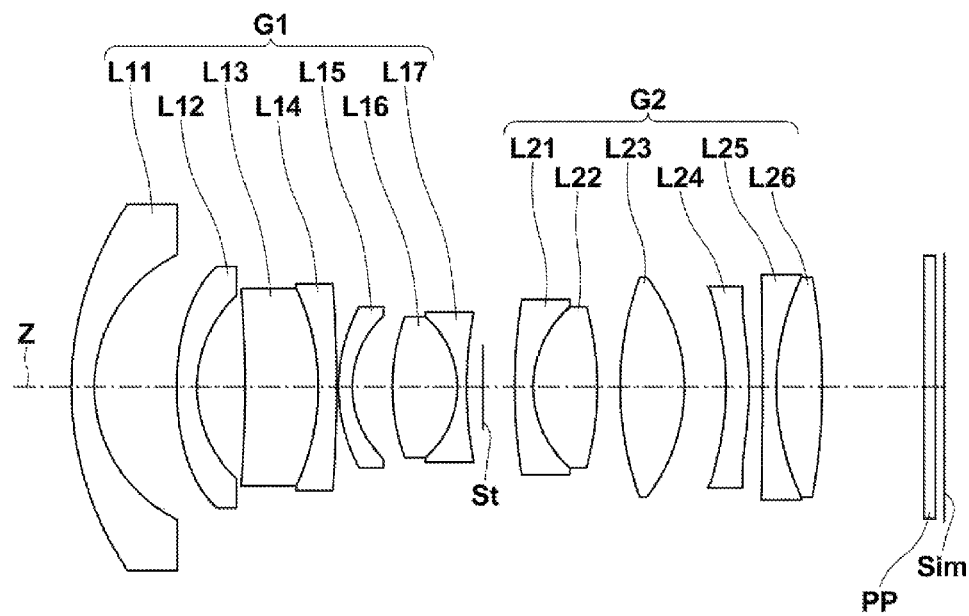
FIG.4 EXAMPLE 1
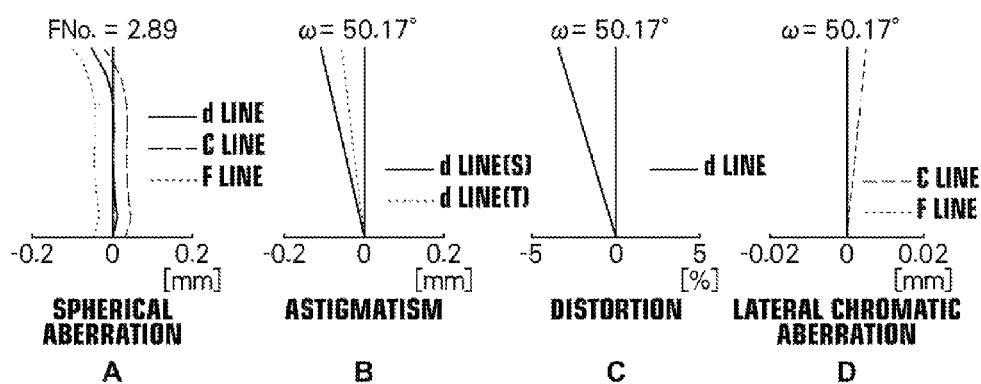

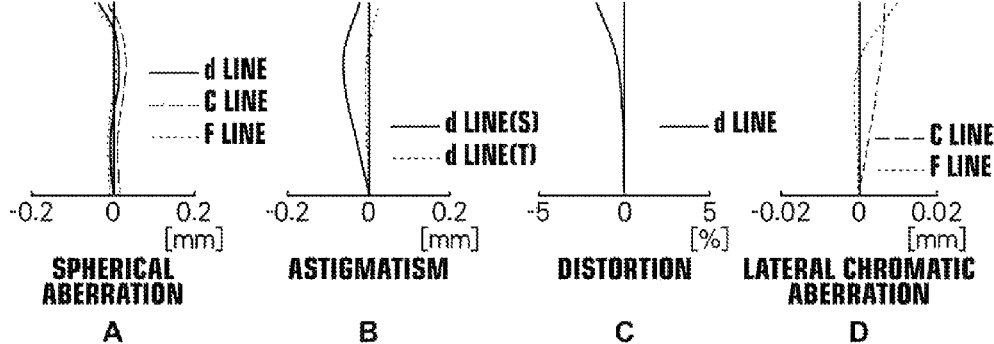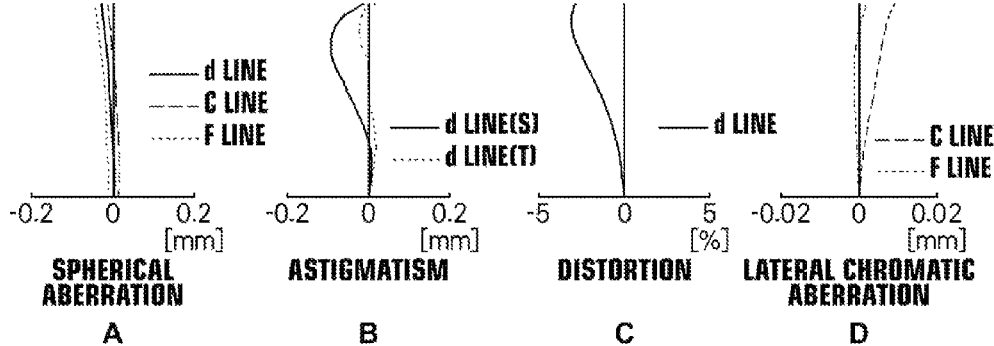

WIDE ANGLE LENS AND IMAGING APPARATUS

CROSS REFERENCE TO RELATED APPLICATIONS

The present application is a Continuation of PCT International Application No. PCT/JP2013/007647 filed on Dec. 26, 2013, which claims priority under 35 U.S.C. §119(a) to Japanese Patent Application No. 2013-052925 filed on Mar. 15, 2013. Each of the above applications is hereby expressly incorporated by reference, in its entirety, into the present application.

BACKGROUND

The present disclosure is related to a wide angle lens and an imaging apparatus. More specifically, the present disclosure is related to a wide angle lens which can be favorably utilized in digital cameras and the like, and to an imaging apparatus equipped with this wide angle lens.

Conventionally, retro focus type lens systems were often employed as wide angle lenses for single lens reflex cameras, because it is necessary to secure a back focus of a sufficient length. Generally, a retro focus type lens system has a long back focus, and has a negative lens group, a stop, and a positive lens group provided in this order from the object side, which is an asymmetrical configuration with respect to the stop. Meanwhile, so called mirrorless cameras, in which a mirror is not provided between an imaging lens and the imaging surface thereof, have been becoming popular recently due to advantages such as being compact and lightweight. Accompanying the popularization of such mirrorless cameras, development of lens systems for such compact cameras is progressing. A long back focus is not necessary in a wide angle lens for a mirrorless camera. However, it is necessary for the angle at which light rays enter an imaging surface to be comparatively small, in order to obtain favorable images. Therefore, a negative lead type lens is often employed. Examples of such negative lead lens systems are disclosed in Japanese Unexamined Patent Publication Nos. 2011-102871 and 2011-209377, for example.

SUMMARY

It is desirable for the total lengths of lens systems to be shortened, in order for the lens systems to be compatible with the recent demand for compact cameras, particularly by reducing the thickness in the direction of the optical axis. In addition, there is demand for lateral chromatic aberration to be favorably corrected, in order for the lens systems to be compatible with digital cameras which have become popular recently. The degree of correction of lateral chromatic aberration which is in demand is high, accompanying the increase in numbers of pixels in imaging elements.

However, conventional retro focus type wide angle lenses for single lens reflex cameras tend to become large because this type of lens system generally has a long back focus. In addition, there is a tendency for favorable correction of lateral chromatic aberration to become difficult because the degree of symmetry with respect to stops is low. For example, the lens system disclosed in Japanese Unexamined Patent Publication No. 2011-102871 will become large because it has a long back focus. In addition, it cannot be said that lateral chromatic aberration is sufficiently corrected in the lens system disclosed in Japanese Unexamined Patent Publication No. 2011-209377.

The present disclosure has been developed in view of the foregoing circumstances. The present disclosure provides a compact wide angle lens in which lateral chromatic aberration is favorably corrected. The present disclosure also provides an imaging apparatus equipped with this wide angle lens.

The wide angle lens of the present disclosure consists of, in order from the object side to the image side:

a front group having a negative refractive power;
a stop; and
a rear group having a positive refractive power;
the front group including, in order from the object side to the image side, a first meniscus lens having a negative refractive power, and a second meniscus lens having a negative refractive power; and
the rear group including a first cemented lens formed by cementing a negative lens and a positive lens, provided in this order from the object side, together, most toward the image side, and a lens having at least one aspherical surface and a negative refractive power provided adjacent to the first cemented lens at the object side thereof.

In the wide angle lens of the present disclosure, it is preferable for Conditional Formula (1) below to be satisfied.

$$80 < \nu d1 \quad (1)$$

wherein $\nu d1$ is the Abbe's number of the positive lens that constitutes the first cemented lens with respect to the d line (wavelength: 587.6 nm).

In addition, it is preferable for Conditional Formula (2) below to be satisfied.

$$-20.0 < (r1+r2)/(r1-r2) < 0.0 \quad (2)$$

wherein r1 is the paraxial radius of curvature of the surface of the lens having at least one aspherical surface and a negative refractive power toward the object side, and r2 is the paraxial radius of curvature of the surface of the lens having at least one aspherical surface and a negative refractive power toward the image side.

In addition, it is preferable for at least one surface of the second meniscus lens to be an aspherical surface.

In addition, it is preferable for a second cemented lens, formed by cementing a positive lens and a negative lens provided in this order from the object side together, to be provided most toward the image side within the front group, and for Conditional Formula (3) below to be satisfied.

$$\nu d2 - \nu d3 < 5 \quad (3)$$

wherein $\nu d2$ is the Abbe's number of the positive lens that constitutes the second cemented lens with respect to the d line (wavelength: 587.6 nm), and $\nu d3$ is the Abbe's number of the negative lens that constitutes the second cemented lens with respect to the d line (wavelength: 587.6 nm).

In addition, it is preferable for a third cemented lens, formed by cementing a negative lens and a positive lens provided in this order from the object side together, to be provided most toward the object side within the rear group.

In addition, it is preferable for focusing operations to be performed by moving the rear group in the direction of the optical axis.

In addition, it is preferable for Conditional Formula (2-1) below to be satisfied.

$$-15.0 < (r1+r2)/(r1-r2) < -5.0 \quad (2-1)$$

In addition, it is preferable for a second cemented lens, formed by cementing a positive lens and a negative lens provided in this order from the object side together, to be provided most toward the image side within the front group, for Conditional Formula (3-1) below to be satisfied, and more preferably, for Conditional Formula (3-2) below to be satisfied.

$$0 < \nu d2 - \nu d3 < 5 \quad (3\text{-}1)$$

$$0 < \nu d2 - \nu d3 < 4 \quad (3\text{-}2)$$

An imaging apparatus of the present disclosure is characterized by being equipped with the wide angle lens of the present disclosure described above.

The wide angle lens of the present disclosure consists of, in order from the object side to the image side, the front group having a negative refractive power; the stop; and the rear group having a positive refractive power. The front group includes, in order from the object side to the image side, the first meniscus lens having a negative refractive power, and the second meniscus lens having a negative refractive power. The rear group includes a first cemented lens formed by cementing a negative lens and a positive lens, provided in this order from the object side, together, most toward the image side, and a lens having at least one aspherical surface and a negative refractive power provided adjacent to the first cemented lens at the object side thereof. Therefore, it becomes possible to realize a compact wide angle lens in which lateral chromatic aberration is favorably corrected.

In addition, the imaging apparatus of the present disclosure is equipped with the wide angle lens of the present disclosure. Therefore, the apparatus can be miniaturized, and high quality images can be obtained.

BRIEF DESCRIPTION OF THE DRAWINGS

FIG. 3 is a cross sectional diagram that illustrates the lens configuration of a wide angle lens according to Example 3 of the present disclosure.

FIG. 4 is a collection of diagrams (A through D) that illustrate aberrations of the wide angle lens of Example 1 of the present disclosure.

FIG. 5 is a collection of diagrams (A through D) that illustrate aberrations of the wide angle lens of Example 2 of the present disclosure.

FIG. 6 is a collection of diagrams (A through D) that illustrate aberrations of the wide angle lens of Example 3 of the present disclosure.

DETAILED DESCRIPTION OF THE PREFERRED EMBODIMENTS

Figure 1:
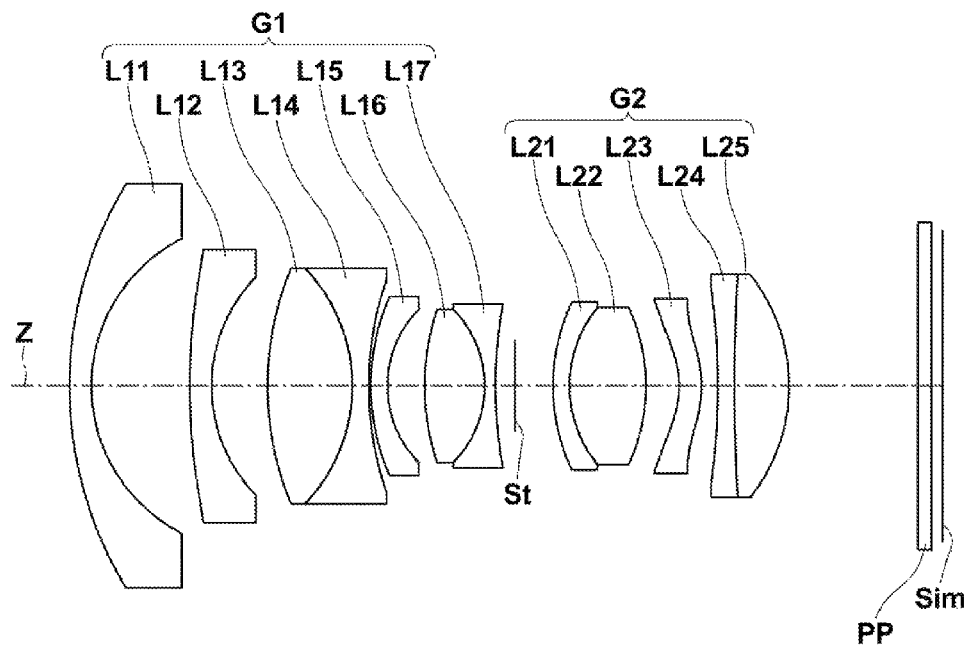
FIG. 1 is a cross sectional diagram that illustrates the lens configuration of a wide angle lens according to an embodiment of the present disclosure (common with Example 1).

Hereinafter, embodiments of the present disclosure will be described in detail with reference to the attached drawings. FIG. 1 is a cross sectional diagram that illustrates the lens configuration of a wide angle lens according to an embodiment of the present disclosure (common with Example 1). The example of the configuration illustrated in FIG. 1 is common with the configuration of a wide angle lens of Example 1 to be described later. In FIG. 1, the left side is the object side, and the right side is the image side.

This wide angle lens consists of, provided along an optical axis Z in order from the object side to the image side, a front group G1 having a negative refractive power, an aperture stop St, and a rear group G2 having a positive refractive power. Note that the aperture stop St illustrated in FIG. 1 does not necessarily represent the size or shape thereof, but merely indicates the position of the aperture stop St along the optical axis Z.

When this wide angle lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 illustrates an example in which a plane parallel plate shaped optical member PP that presumes such filters is provided between the rear group G2 and the imaging surface Sim.

The front group G1 includes, in order from the object side to the image side, a first meniscus lens L11 having a negative refractive power, and a second meniscus lens L12 having a negative refractive power.

The rear group G2 includes a first cemented lens, formed by cementing a negative lens L24 and a positive lens L25 provided in this order from the object side together, provided most toward the image side, and a lens L23 having at least one aspherical surface and a negative refractive power, provided adjacent to the first cemented lens toward the object side thereof.

In the wide angle lens of the present disclosure, the front group G1 includes, in order from the object side to the image side, the first meniscus lens L11 having a negative refractive power, and the second meniscus lens L12 having a negative refractive power. This configuration is advantageous from the viewpoint of widening the angle of view.

In addition, it is effective to provide a cemented lens that includes a positive lens and a negative lens at a position as far as possible from the aperture stop St in order to favorably correct lateral chromatic aberration. Therefore, the wide angle lens of the present disclosure includes the cemented lens formed by the negative lens L24 and the positive lens L25 provided in this order from the object side most toward the image side in the rear group G2. This configuration is advantageous from the viewpoint of correcting lateral chromatic aberration, and it becomes possible to obtain favorable optical performance.

Further, the wide angle lens of the present disclosure includes the lens L23 having at least one aspherical surface and a negative refractive power, provided adjacent to the above cemented lens at the object side thereof. Therefore, the degree of symmetry with the first meniscus lens L11 having a negative refractive power and the second meniscus lens L12 having a negative refractive power can be increased with respect to the aperture stop St. As a result, favorable correction of field curvature becomes possible.

Note that with respect to the lens which is provided adjacent to the above cemented lens at the object side thereof, the balance between spherical aberration and astigmatism can be more favorably maintained if the lens has at least one aspherical surface and a negative refractive power compared to a case in which the lens has a positive refractive power or is a spherical lens. Thereby, it is not necessary to increase the number of lenses in order to favorably correct field curvature, which is preferable.

In the wide angle lens of the present disclosure, it is preferable for Conditional Formula (1) below to be satisfied. Satisfying Conditional Formula (1) is advantageous from the viewpoint of correcting lateral chromatic aberration, and particularly from the viewpoint of correcting high order lateral chromatic aberration.

$$80 < vd1 \quad (1)$$

wherein vd1 is the Abbe's number of the positive lens that constitutes the first cemented lens with respect to the d line (wavelength: 587.6 nm).

In addition, it is preferable for Conditional Formula (2) below to be satisfied. By configuring the wide angle lens such that the value of (r1+r2)/(r1−r2) is not less than the lower limit defined in Conditional Formula (2), the negative power of the lens can be prevented from becoming excessively strong, and astigmatism can be maintained small. By configuring the wide angle lens such that the value of (r1+r2)/(r1−r2) is not greater than the upper limit defined in Conditional Formula (2), correction of field curvature can be maintained within an appropriate range. Note that more favorable properties can be obtained if Conditional Formula (2-1) below is satisfied.

$$-20.0 < (r1+r2)/(r1-r2) < 0.0 \quad (2)$$

$$-15.0 < (r1+r2)/(r1-r2) < -5.0 \quad (2\text{-}1)$$

wherein r1 is the paraxial radius of curvature of the surface of the lens having at least one aspherical surface and a negative refractive power toward the object side, and r2 is the paraxial radius of curvature of the surface of the lens having at least one aspherical surface and a negative refractive power toward the image side.

In addition, it is preferable for at least one surface of the second meniscus lens L12 to be an aspherical surface. Distortion can be favorably corrected by this configuration being adopted. In addition, an aspherical surface having a smaller outer diameter is produced compared to a case in which the first meniscus lens L11 has an aspherical surface. Therefore, adopting this configuration is advantageous from the viewpoints of cost and difficulties in production. Further, distortion and field curvature can be favorably corrected even if a small number of negative lenses greatly bend light rays in the case that the second meniscus lens L12 has an aspherical surface compared to a case in which the second meniscus lens L12 does not have an aspherical surface. Therefore, the lens system can have a smaller number of lenses and can be miniaturized.

In addition, it is preferable for a second cemented lens, formed by cementing a positive lens L16 and a negative lens L17 provided in this order from the object side together, to be provided most toward the image side within the front group G1, and for Conditional Formula (3) below to be satisfied. Providing such a cemented lens is advantageous from the viewpoint of correcting longitudinal chromatic aberration. The correction of longitudinal chromatic aberration can be maintained within an appropriate range, by Conditional Formula (3) being satisfied. Note that more favorable properties can be obtained if Conditional Formula (3-1) below, and more preferably Conditional Formula (3-2), is satisfied.

$$vd2 - vd3 < 5 \quad (3)$$

$$0 < vd2 - vd3 < 5 \quad (3\text{-}1)$$

$$0 < vd2 - vd3 < 4 \quad (3\text{-}2)$$

wherein vd2 is the Abbe's number of the positive lens that constitutes the second cemented lens with respect to the d line (wavelength: 587.6 nm), and vd3 is the Abbe's number of the negative lens that constitutes the second cemented lens with respect to the d line (wavelength: 587.6 nm).

In addition, it is preferable for a third cemented lens, formed by cementing a negative lens L21 and a positive lens L22 provided in this order from the object side together, to be provided most toward the object side within the rear group G2. Adopting this configuration is advantageous from the viewpoint of correcting longitudinal chromatic aberration.

In addition, it is preferable for focusing operations to be performed by moving the rear group in the direction of the optical axis. Fluctuations in field curvature can be suppressed when focusing on objects at close distances by adopting this configuration.

A sufficiently wide angle of view can be achieved, by configuring the wide angle lens such that the half angle of view at the wide angle end is greater than 45°.

In the present wide angle lens, a specific preferred material of the component provided most toward the object side is glass. Alternatively, a transparent ceramic material may be employed.

In the case that the present wide angle lens is to be utilized in an environment in which the wide angle lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the wide angle lens of the present disclosure will be described.

First, the wide angle lens of Example 1 will be described. FIG. 1 is a collection of sectional diagrams that illustrate the lens configuration of the wide angle lens of Example 1. Note that the optical member PP is also illustrated, the left side is the object side, the right side is the image side, and the aperture stop St in the drawings do not necessarily represent the size or the shape thereof, but the position thereof along the optical axis Z, in FIG. 1 and FIGS. 2 and 3 that correspond to Examples 2 and 3 to be described later.

Basic lens data are shown in Table 1 and data related to various items are shown in Table 2 for the wide angle lens of Example 1. In the following description, the meanings of the symbols in the tables will be described for Example 1. The meanings of the symbols are basically the same for Examples 2 and 3.

In the lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1 st surface along the optical axis Z are shown in the column Di. The refractive indices of jth (j=1, 2, 3, . . . ) optical elements that sequentially increase from the object side to the image side, with the optical element at the most object side designated as first, with respect to the d line (wavelength: 587.6 nm) are shown in the column Ndj. The Abbe's numbers of the jth optical element with respect to the d line (wavelength: 587.6 nm) are shown in the column νdj.

Here, the signs of the radii of curvature are positive in cases that the surface shape is convex toward the object side, and negative in cases that the surface shape is convex toward the image side. The aperture stop St and the optical member PP are also included in the basic lens data. Text reading "(stop)" is indicated along with a surface number in the column of the surface numbers at the surface corresponding to the aperture stop.

Table 2 shows the values of the focal length f', the back focus Bf', the F value (FNo.), and the full angle of view (2ω) as the data related to various items.

In the basic lens data, the data related to various items, and the data related to the movable surfaces, degrees are used as the units for angles and mm are used as the units for lengths. However, it is possible for optical systems to be proportionately enlarged or proportionately reduced and utilized. Therefore, other appropriate units may be used.

In the lens data of Table 1, the symbol "*" is appended to the surface numbers of aspherical surfaces, and numerical values that represent the paraxial radii of curvature are shown as the radii of curvature of the aspherical surfaces. Data of Table 3 related to aspherical surface coefficients show the surface numbers of the aspherical surfaces and aspherical surface coefficients related to the aspherical surfaces. The aspherical coefficients are the values of coefficients KA and Am (m=3, 4, 5, ... 20) in formula (A) below.

$$Zd = C \cdot h^2 / \{1 + (1 - KA \cdot C^2 \cdot h^2)^{1/2}\} + \Sigma Am \cdot h^m \quad (A)$$

wherein: Zd is the depth of the aspherical surface (the length of a normal line from a point on the aspherical surface at a height h to a plane perpendicular to the optical axis in contact with the peak of the aspherical surface), h is height (the distance from the optical axis), C is the inverse of the paraxial radius of curvature, and KA and Am (m=3, 4, 5, ..., 20) are aspherical surface coefficients.

TABLE 1

Example 1: Lens Data (N and ν are for the d line)

| Si (Surface Number) | Ri (Radius of Curvature) | Di (Distance) | Ndj (Refractive Index) | νdj (Abbe's Number) |
|---|---|---|---|---|
| 1 | 35.7143 | 2.00 | 1.754999 | 52.32 |
| 2 | 15.1675 | 9.00 | | |
| *3 | 63.0656 | 2.00 | 1.517598 | 63.50 |
| 4 | 14.3618 | 5.12 | | |
| 5 | 28.2767 | 7.76 | 1.804000 | 46.58 |
| 6 | −15.6249 | 1.50 | 1.595509 | 39.24 |
| 7 | 30.0090 | 0.20 | | |
| 8 | 20.6158 | 1.50 | 1.592824 | 68.63 |
| 9 | 10.0000 | 3.42 | | |
| 10 | 22.4239 | 5.51 | 1.903658 | 31.32 |
| 11 | −10.0000 | 1.00 | 1.740769 | 27.79 |
| 12 | 42.5957 | 1.75 | | |
| 13 (stop) | ∞ | 3.50 | | |
| 14 | 17.9605 | 1.51 | 1.603420 | 38.03 |
| 15 | 11.3636 | 7.00 | 1.496999 | 81.54 |
| 16 | −17.0326 | 3.04 | | |
| *17 | −8.3333 | 2.04 | 1.806100 | 40.40 |
| *18 | −10.3304 | 1.50 | | |
| 19 | −65.0769 | 1.51 | 1.922860 | 18.90 |
| 20 | 167.7408 | 5.00 | 1.496999 | 81.54 |
| 21 | −16.4250 | 11.81 | | |
| 22 | ∞ | 1.22 | 1.516798 | 64.20 |
| 23 | ∞ | | | |

TABLE 2

Example 1: Items (d line)

| | |
|---|---|
| f' | 12.37 |
| Bf' | 1.00 |
| FNo. | 2.89 |
| 2ω[°] | 100.34 |

TABLE 3

Example 1: Aspherical Surface Coefficients

| | Surface Number | | |
|---|---|---|---|
| | 3 | 17 | 18 |
| KA | −2.5397691E+00 | −4.1108442E−01 | −1.6776985E−01 |
| A3 | −4.6381320E−05 | 3.0843868E−04 | 3.7793553E−04 |
| A4 | 3.3758954E−05 | 2.3389895E−04 | 1.0836979E−04 |
| A5 | −1.1105315E−05 | −1.0977775E−04 | 7.1960203E−05 |
| A6 | 5.0004865E−06 | 6.7634935E−05 | −3.4384333E−06 |
| A7 | −1.1781513E−06 | −1.6216965E−05 | −4.4562234E−06 |
| A8 | 1.1151818E−07 | 1.2554669E−06 | 1.5763041E−06 |
| A9 | 2.5850597E−09 | 6.6626637E−07 | −5.1157324E−08 |
| A10 | −9.4537224E−10 | −2.9519110E−07 | −4.0918396E−08 |
| A11 | −4.0621889E−11 | 5.5324227E−08 | 2.2537318E−09 |
| A12 | 1.0300527E−11 | −3.5952437E−09 | 8.0047469E−10 |
| A13 | 5.2076320E−13 | −7.1462247E−10 | −6.3400336E−11 |
| A14 | −1.2180825E−13 | 1.3976078E−10 | −2.6957937E−12 |
| A15 | 8.9573145E−16 | 1.6183572E−11 | −1.4910124E−13 |
| A16 | 4.9662513E−16 | −7.9557073E−12 | −1.2498810E−13 |
| A17 | −9.9403738E−18 | 1.0191129E−12 | 4.2958881E−14 |
| A18 | −1.1485039E−18 | −4.9743211E−14 | −2.3692605E−15 |
| A19 | 3.8536898E−20 | −2.6958448E−16 | −1.5453271E−16 |
| A20 | 1.1545287E−22 | 7.5049473E−17 | 1.2433694E−17 |

A through D of FIG. 4 are diagrams that illustrate various aberrations of the wide angle lens of Example 1. The spherical aberration, the astigmatism, the distortion, and the lateral chromatic aberration are illustrated in A through D of FIG. 4, respectively.

The diagrams that illustrate spherical aberration, astigmatism, and distortion show aberrations related to the d line (wavelength: 587.6 nm). The diagram that illustrates spherical aberration show aberrations related to the d line (wavelength: 587.6 nm), aberrations related to the C line (wavelength: 656.3 nm), and aberrations related to the F line (wavelength: 486.1 nm), as solid lines, broken lines, and dotted lines, respectively. In the diagram that illustrates astigmatism, aberrations in the sagittal direction are indicated by solid lines, while aberrations in the tangential direction are indicated by dotted lines. In the diagram that illustrates lateral chromatic aberration, aberrations related to the C line (wavelength: 656.3 nm) and aberrations related to the F line (wavelength: 486.1 nm) are shown as broken lines and dotted lines, respectively. Note that in the diagrams that illustrate spherical aberrations, "FNo." denotes F values. In the other diagrams that illustrate the aberrations, "ω" denotes half angles of view.

Figure 2:
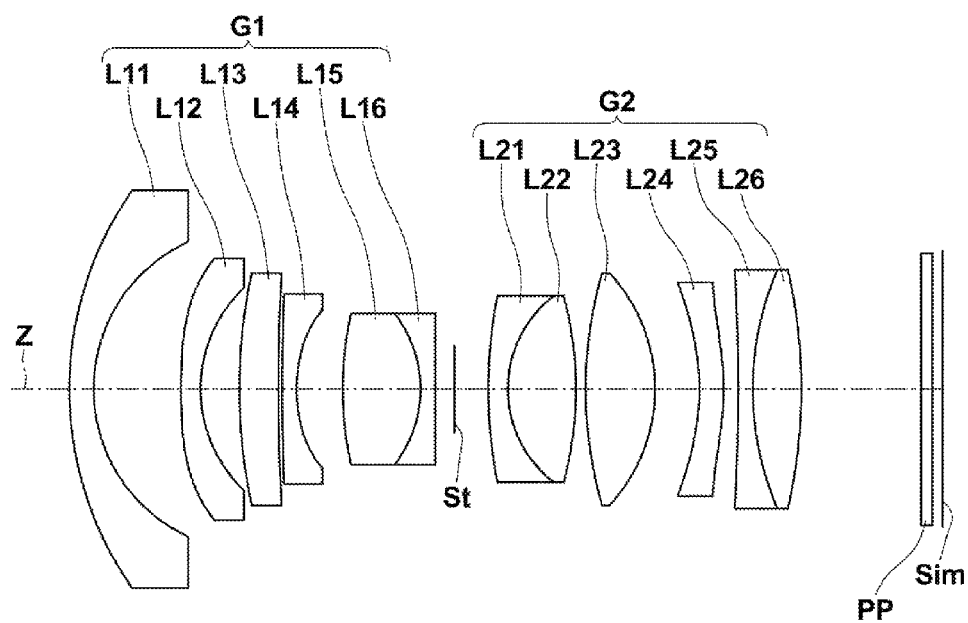
FIG. 2 is a cross sectional diagram that illustrates the lens configuration of a wide angle lens according to Example 2 of the present disclosure.

Next, a wide angle lens of Example 2 will be described. FIG. 2 is a cross sectional diagram that illustrates the lens configuration of the wide angle lens of Example 2.

In addition, basic lens data are shown in Table 4, data related to various items are shown in Table 5, and data related to aspherical surface coefficients are shown in Table 6 for the wide angle lens of Example 2. Further, various aberrations of the zoom lens of Example 2 are shown in A through D of FIG. 5.

TABLE 5

| Example 2: Items (d line) | |
|---|---|
| f | 12.37 |
| Bf | 1.00 |
| FNo. | 2.89 |
| 2ω[°] | 98.82 |

TABLE 6

Example 2: Aspherical Surface Coefficients

| | Surface Number | | | |
|---|---|---|---|---|
| | 3 | 8 | 18 | 19 |
| KA | 1.1675564E+00 | −1.6708937E+00 | −1.0556905E−01 | −1.4731264E+00 |
| A3 | −4.1142818E−05 | −3.6877045E−05 | 2.3434678E−04 | 2.6974211E−04 |
| A4 | 1.0478726E−04 | 1.5508029E−04 | −3.9829454E−06 | 2.1843114E−05 |
| A5 | 9.6044750E−07 | 5.4486186E−05 | 5.0738342E−07 | 2.7641470E−06 |
| A6 | −7.5189384E−07 | −1.4541218E−05 | 1.7566283E−07 | 9.1499598E−08 |
| A7 | 3.7115233E−09 | −3.0191064E−06 | 5.7939923E−09 | 3.1209757E−09 |
| A8 | 6.8901100E−09 | 2.3501310E−06 | −2.8249169E−09 | −5.1790404E−09 |
| A9 | −2.0907708E−10 | −4.7369850E−07 | −8.6165890E−11 | 3.3446068E−10 |
| A10 | −4.8208552E−11 | 2.8520190E−08 | −2.0892805E−11 | −3.7715015E−12 |
| A11 | 4.3130175E−12 | 2.9193494E−09 | 5.1320819E−12 | −1.2876017E−13 |
| A12 | 1.1007266E−13 | −6.1761937E−10 | −1.5319697E−13 | 2.3549564E−13 |
| A13 | −4.3353775E−14 | 1.0192064E−10 | 3.7219831E−14 | −6.5426596E−15 |
| A14 | 1.5457150E−15 | −1.5493564E−11 | −1.2304123E−15 | −3.9740730E−15 |
| A15 | 2.9467643E−16 | 3.8468302E−14 | −1.0071454E−16 | 4.4818406E−16 |
| A16 | −3.0880869E−17 | 3.3131538E−13 | −9.3564730E−17 | −1.0681782E−17 |
| A17 | 4.6925471E−19 | −4.4526422E−14 | 9.9399854E−18 | −4.3965543E−18 |
| A18 | 7.3257320E−20 | 2.5992280E−15 | −5.2313268E−20 | 6.6810542E−19 |
| A19 | −4.1668229E−21 | −7.5026027E−17 | −2.1991716E−20 | −3.7607494E−20 |
| A20 | 6.9022354E−23 | 1.0049307E−18 | 7.2227557E−22 | 7.8507871E−22 |

TABLE 4

Example 2: Lens Data (N and ν are for the d line)

| Si (Surface Number) | Ri (Radius of Curvature) | Di (Distance) | Ndj (Refractive Index) | νdj (Abbe's Number) |
|---|---|---|---|---|
| 1 | 35.7138 | 2.50 | 1.620411 | 60.29 |
| 2 | 16.7473 | 9.00 | | |
| *3 | 75.1050 | 2.00 | 1.517598 | 63.50 |
| 4 | 14.3758 | 4.00 | | |
| 5 | 56.5539 | 4.00 | 1.882997 | 40.76 |
| 6 | 205.9076 | 0.40 | | |
| 7 | 250.0000 | 1.50 | 1.568672 | 58.50 |
| *8 | 17.1167 | 4.74 | | |
| 9 | 36.2716 | 8.01 | 1.903658 | 31.32 |
| 10 | −12.6574 | 1.50 | 1.739998 | 28.30 |
| 11 | −23440.1546 | 2.00 | | |
| 12 (stop) | ∞ | 3.50 | | |
| 13 | 49.9990 | 2.01 | 1.834000 | 37.16 |
| 14 | 12.1258 | 7.00 | 1.496999 | 81.54 |
| 15 | −37.0879 | 1.00 | | |
| 16 | 43.1376 | 7.15 | 1.603112 | 60.64 |
| 17 | −17.5870 | 4.55 | | |
| *18 | −23.3217 | 2.50 | 1.806100 | 40.40 |
| *19 | −27.4967 | 1.50 | | |
| 20 | −213.4988 | 1.51 | 1.805181 | 25.42 |
| 21 | 31.2496 | 5.00 | 1.496999 | 81.54 |
| 22 | −54.7325 | 12.29 | | |
| 23 | ∞ | 1.22 | 1.516798 | 64.20 |
| 24 | ∞ | | | |

Next, a wide angle lens of Example 3 will be described. FIG. 3 is a cross sectional diagram that illustrates the lens configuration of the wide angle lens of Example 3.

In addition, basic lens data are shown in Table 7, data related to various items are shown in Table 8, and data related to aspherical surface coefficients are shown in Table 9 for the wide angle lens of Example 3. Further, various aberrations of the zoom lens of Example 3 are shown in A through D of FIG. 6.

TABLE 7

Example 3: Lens Data (N and ν are for the d line)

| Si (Surface Number) | Ri (Radius of Curvature) | Di (Distance) | Ndj (Refractive Index) | νdj (Abbe's Number) |
|---|---|---|---|---|
| 1 | 35.7143 | 2.50 | 1.754999 | 52.32 |
| 2 | 16.1037 | 9.00 | | |
| *3 | 31.0923 | 2.20 | 1.517598 | 63.50 |
| 4 | 13.8073 | 5.26 | | |
| 5 | −134.5897 | 8.01 | 1.804000 | 46.58 |
| 6 | −25.2150 | 2.00 | 1.622992 | 58.16 |
| 7 | −145.5613 | 0.20 | | |
| 8 | 18.3105 | 1.50 | 1.589130 | 61.14 |
| 9 | 10.6071 | 4.37 | | |
| 10 | 22.4200 | 7.12 | 1.903658 | 31.32 |
| 11 | −10.2041 | 1.03 | 1.800000 | 29.84 |
| 12 | 44.1983 | 1.75 | | |
| 13 (stop) | ∞ | 3.50 | | |
| 14 | 62.7009 | 2.01 | 1.749505 | 35.33 |
| 15 | 11.6327 | 7.00 | 1.496999 | 81.54 |
| 16 | −33.1530 | 2.50 | | |
| 17 | 34.9917 | 7.00 | 1.592824 | 68.63 |
| 18 | −19.5901 | 4.54 | | |
| *19 | −29.6198 | 2.50 | 1.806100 | 40.40 |
| *20 | −35.3608 | 1.50 | | |

TABLE 7-continued

Example 3: Lens Data (N and ν are for the d line)

| Si (Surface Number) | Ri (Radius of Curvature) | Di (Distance) | Ndj (Refractive Index) | νdj (Abbe's Number) |
|---|---|---|---|---|
| 21 | −536.1760 | 1.51 | 1.903658 | 31.32 |
| 22 | 27.7775 | 5.00 | 1.496999 | 81.54 |
| 23 | −67.4928 | 11.11 | | |
| 24 | ∞ | 1.22 | 1.516798 | 64.20 |
| 25 | ∞ | | | |

TABLE 8

Example 3: Items (d line)

| | |
|---|---|
| f | 12.37 |
| Bf | 1.00 |
| FNo. | 2.88 |
| 2ω[°] | 101.26 |

TABLE 9

Example 3: Aspherical Surface Coefficients

| | Surface Number | | |
|---|---|---|---|
| | 3 | 19 | 20 |
| KA | 6.0084647E−01 | 6.8961760E−02 | 1.6993082E+00 |
| A3 | −1.1693557E−04 | 5.0277633E−04 | 5.8153836E−04 |
| A4 | 1.2394327E−04 | −1.3932002E−04 | −1.4179526E−04 |
| A5 | −4.0718928E−05 | −1.4374781E−05 | 1.0401592E−05 |
| A6 | 1.1208848E−05 | 1.9281589E−05 | 1.0057238E−05 |
| A7 | −1.7227065E−06 | −6.0502942E−06 | −2.5051159E−06 |
| A8 | 1.2143775E−07 | 1.3637186E−06 | 1.4854913E−07 |
| A9 | 1.2268516E−10 | −2.7271848E−07 | 7.1255346E−09 |
| A10 | −7.0223067E−11 | 3.6446851E−08 | 2.2722285E−09 |
| A11 | −7.2344725E−11 | −1.5185382E−09 | −5.2736374E−10 |
| A12 | 1.3194709E−12 | −1.3419985E−10 | −8.3137171E−12 |
| A13 | 8.4996329E−13 | −1.1449942E−11 | 5.8426320E−12 |
| A14 | 1.2180683E−15 | 3.9571552E−12 | −3.4409453E−13 |
| A15 | −1.0070530E−14 | 1.5637021E−13 | 4.0684691E−14 |
| A16 | 4.0232003E−16 | −6.5260686E−14 | −4.6741318E−15 |
| A17 | 2.2830536E−17 | 1.5199458E−15 | −1.4194107E−16 |
| A18 | −3.3523161E−19 | 4.2204787E−16 | 5.0748872E−17 |
| A19 | −1.2653441E−19 | −3.3053044E−17 | −2.6611733E−18 |
| A20 | 4.5316098E−21 | 7.3141862E−19 | 3.9831975E−20 |

Table 10 shows values corresponding to Conditional Formulae (1) through (3) for the wide angle lenses of Examples 1 through 3. Note that all of the Examples use the d line as a reference wavelength, and the values shown in Table 10 are those with respect to the reference wavelength.

TABLE 10

| Formula | Condition | Example 1 | Example 2 | Example 3 |
|---|---|---|---|---|
| (1) | 80 < νd1 | 81.54 | 81.54 | 81.54 |
| (2) | −20.0 < (r1 + r2)/(r1 − r2) < 0.0 | −9.35 | −12.17 | −11.32 |
| (3) | νd2 − νd3 < 5 | 3.53 | 3.02 | 1.48 |

The above data indicates that all of the wide angle lenses of Examples 1 through 3 satisfy Conditional Formulae (1) through (3). Therefore, it can be understood that the wide angle lenses of the Examples are compact wide angle lenses that are capable of favorably correcting lateral chromatic aberration.

Figure 7A:
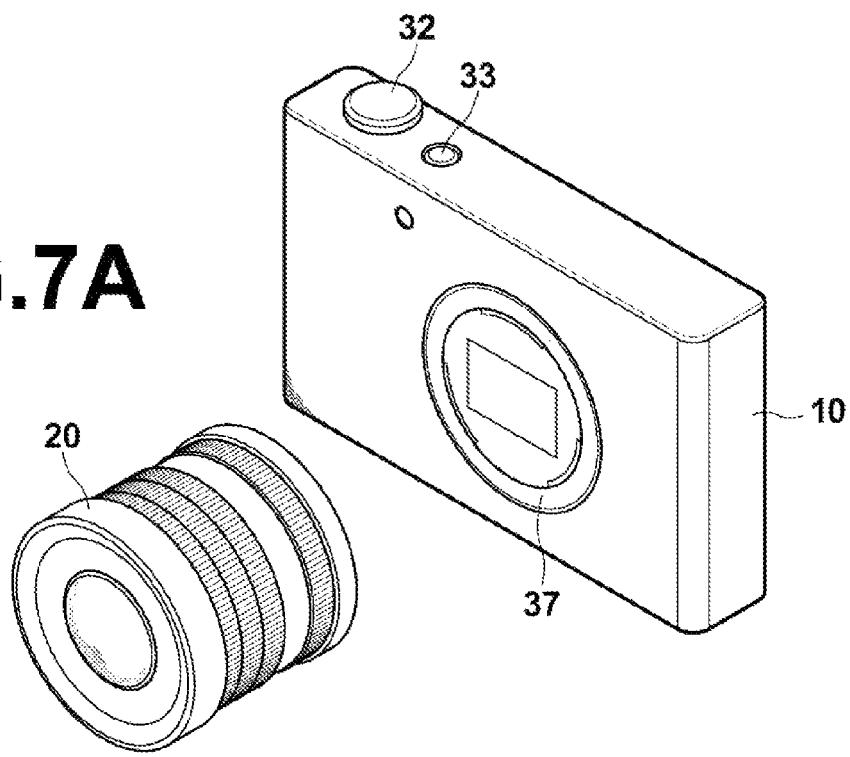
FIG. 7A is a collection of diagrams that illustrates the outer appearance of a mirrorless interchangeable lens camera as an imaging apparatus according to an embodiment of the present disclosure.
Figure 7B:
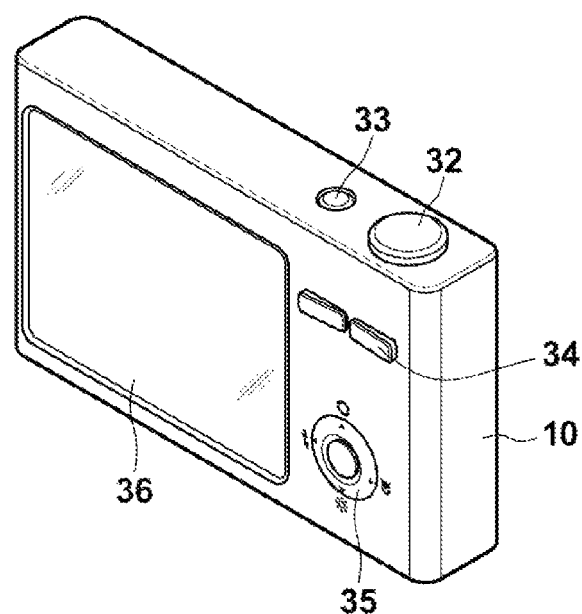
FIG. 7B is a collection of diagrams that illustrates the outer appearance of a mirrorless interchangeable lens camera as an imaging apparatus according to an embodiment of the present disclosure.

Next, an imaging apparatus according to an embodiment of the present disclosure will be described. FIGS. 7A and 7B are collections of diagrams that illustrate the outer appearance of an example of a mirrorless interchangeable lens camera that employs the wide angle lens according to the embodiment of the present disclosure, as an example of the imaging apparatus according to the embodiment of the present disclosure.

Particularly, FIG. 7A illustrates the outer appearance of the camera as viewed from the front, and FIG. 7B illustrates the outer appearance of the camera as viewed from the back. The camera is equipped with a camera main body 10. A shutter release button 32 and a power button 33 are provided on the upper surface of the camera main body 10. A display section 36 and operating sections 34 and 35 are provided on the back surface of the camera main body 10. The display section 36 is for displaying obtained images.

An imaging aperture, into which light from imaging targets enters, is provided in the central portion of the front surface of the camera main body 10. A mount 37 is provided at a position corresponding to the imaging aperture. The mount 37 enables an interchangeable lens 20 to be mounted onto the camera main body 10. The interchangeable lens 20 is a lens barrel in which lens members are housed. An imaging element that outputs image signals corresponding to images of subjects formed by the interchangeable lens 20, such as a CCD, a signal processing circuit that processes the image signals output from the imaging element to generate images, a recording medium for storing the generated images, etc. are provided within the camera main body 10. In this camera, a pressing operation of the shutter release button 32 causes a photography operation of a single frame of a still image to be executed. Image data obtained by photography are stored in the recording medium (not shown) within the camera main body 10.

The camera can be miniaturized as a whole by employing the wide angle lens of the present embodiment as the interchangeable lens 20 of the mirrorless interchangeable lens camera. At the same time, images having high image quality, in which lateral chromatic aberration is favorably corrected, can be obtained.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, etc. of the lens components are not limited to those exemplified in the above Examples, and may be different values.

What is claimed is:

1. A wide angle lens consisting of, in order from the object side to the image side:
   a front group having a negative refractive power;
   a stop; and
   a rear group having a positive refractive power;
   the front group including, in order from the object side to the image side, a first meniscus lens having a negative refractive power, and a second meniscus lens having a negative refractive power;
   the rear group including a first cemented lens formed by cementing together a negative lens and a positive lens, provided in this order from the object side, the first cemented lens being closest the image side, and
   the rear group further including a lens having at least one aspherical surface and a negative refractive power provided adjacent to the first cemented lens at the object side thereof with no lens between the first cemented lens and the lens having at least one aspherical surface and a negative refractive power; and
the conditional formula below being satisfied:

$$-15.0<(r1+r2)/(r1-r2)<-5.0 \qquad (2\text{-}1)$$

wherein r1 is the paraxial radius of curvature of the surface of the lens having at least one aspherical surface and a negative refractive power toward the object side, and r2 is the paraxial radius of curvature of the surface of the lens having at least one aspherical surface and a negative refractive power toward the image side.

2. A wide angle lens as defined in claim 1, wherein the conditional formula below is satisfied:

$$80<vd1 \qquad (1)$$

wherein vd1 is the Abbe's number of the positive lens that constitutes the first cemented lens with respect to the d line.

3. A wide angle lens as defined in claim 1, wherein:
at least one surface of the second meniscus lens is an aspherical surface.

4. A wide angle lens as defined in claim 1, further comprising:
a second cemented lens, formed by cementing a positive lens and a negative lens provided in this order from the object side together, provided most toward the image side within the front group, and wherein the conditional formula below is satisfied:

$$vd2-vd3<5 \qquad (3)$$

wherein vd2 is the Abbe's number of the positive lens that constitutes the second cemented lens with respect to the d line, and vd3 is the Abbe's number of the negative lens that constitutes the second cemented lens with respect to the d line.

5. A wide angle lens as defined in claim 4, further comprising:
a third cemented lens, formed by cementing a negative lens and a positive lens provided in this order from the object side together, provided most toward the object side within the rear group.

6. A wide angle lens as defined in claim 1, wherein:
focusing operations are performed by moving the rear group in the direction of the optical axis.

7. A wide angle lens as defined in claim 1, further comprising:
a second cemented lens, formed by cementing a positive lens and a negative lens provided in this order from the object side together, provided most toward the image side within the front group, and wherein the conditional formula below is satisfied:

$$0<vd2-vd3<5 \qquad (3\text{-}1)$$

wherein vd2 is the Abbe's number of the positive lens that constitutes the second cemented lens with respect to the d line, and vd3 is the Abbe's number of the negative lens that constitutes the second cemented lens with respect to the d line.

8. A wide angle lens as defined in claim 1, further comprising:
a second cemented lens, formed by cementing a positive lens and a negative lens provided in this order from the object side together, provided most toward the image side within the front group, and wherein the conditional formula below is satisfied:

$$0<vd2-vd3<4 \qquad (3\text{-}2)$$

wherein vd2 is the Abbe's number of the positive lens that constitutes the second cemented lens with respect to the d line, and vd3 is the Abbe's number of the negative lens that constitutes the second cemented lens with respect to the d line.

9. An imaging apparatus equipped with the wide angle lens as defined in claim 1.

* * * * *